United States Patent
Li et al.

(10) Patent No.: US 7,106,780 B2
(45) Date of Patent: Sep. 12, 2006

(54) RAKE-BASED CDMA RECEIVERS FOR MULTIPLE RECEIVER ANTENNAS

(75) Inventors: Bin Li, Ronkonkoma, NY (US); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 172 days.

(21) Appl. No.: 10/725,788

(22) Filed: Dec. 2, 2003

(65) Prior Publication Data

US 2005/0069024 A1  Mar. 31, 2005

Related U.S. Application Data

(60) Provisional application No. 60/507,874, filed on Sep. 30, 2003.

(51) Int. Cl.
*H04B 15/00* (2006.01)
*H04K 1/00* (2006.01)
*H04L 27/30* (2006.01)

(52) U.S. Cl. .................................................. 375/140
(58) Field of Classification Search ................ 375/130, 375/140, 144, 147, 148, 142, 150, 349, 267, 375/347, 346, 285
See application file for complete search history.

(56) References Cited

U.S. PATENT DOCUMENTS

| | | | |
|---|---|---|---|
| 6,304,750 B1 * | 10/2001 | Rashid-Farrokhi et al. | 455/137 |
| 6,442,193 B1 | 8/2002 | Hirsch | |
| 6,825,808 B1 * | 11/2004 | Kimata et al. | 342/378 |
| 6,879,624 B1 * | 4/2005 | Sano | 375/147 |
| 2002/0057660 A1 * | 5/2002 | Park et al. | 370/335 |
| 2002/0190900 A1 * | 12/2002 | Kimata et al. | 342/368 |
| 2003/0186725 A1 * | 10/2003 | Miya et al. | 455/561 |
| 2004/0170218 A1 * | 9/2004 | Molisch et al. | 375/147 |

FOREIGN PATENT DOCUMENTS

| | | |
|---|---|---|
| TW | 466841 | 12/2001 |
| TW | 522664 | 3/2003 |
| WO | 02/43263 | 5/2002 |

* cited by examiner

Primary Examiner—Jean B. Corrielus
(74) Attorney, Agent, or Firm—Volpe and Koenig, P.C.

(57) ABSTRACT

A receiver comprises a plurality of antenna elements for receiving a data signal. Each antenna element has a plurality of Rake fingers. Each Rake finger processes a received multipath component of the received data signal of its antenna element by applying a complex weight gain to that received multipath component. A complex weight gain generator determines the complex weight gain for each Rake finger for each antenna element using an input from all the Rake fingers. A summer combines an output of each Rake finger to produce an estimate of the data signal.

20 Claims, 5 Drawing Sheets

RAKE-BASED CDMA RECEIVERS FOR MULTIPLE RECEIVER ANTENNAS

CROSS REFERENCE TO RELATED APPLICATIONS

This application claims priority from U.S. provisional application Ser. No. 60/507,874, filed Sep. 30, 2003, which is incorporated by reference as if fully set forth.

FIELD OF THE INVENTION

The present invention relates to the field of wireless communications. More specifically, the present invention relates to a code division multiple access (CDMA) receiver.

BACKGROUND

A received CDMA signal, $r_l(t)$, at $l^{th}$ ($1 \leq L$) receiver antenna element out of an L element array is denoted as per Equation 1:

$$r_l(t) = \sum_{k=1}^{K} \sum_{n=-\infty}^{\infty} \sum_{m=1}^{M} A_k s_{k,n} p_k(t-nT-\tau_{k,m}) h_{k,m,l}(t) + n(t) \quad \text{Equation 1}$$

where $A_k$ is the signal amplitude of $k^{th}$ user, $s_{k,n}$ is the $n^{th}$ symbol of $k^{th}$ user, $p_k(t)$ is the signature waveform, including the spread code and pulse shaping waveform, of $k^{th}$ user. $h_{k,m,l}(t)$ is the channel response of $m^{th}$ path from $l^{th}$ antenna of $k^{th}$ user. $n(t)$ is the combined interference which is typically due to the interference from other cells and additive channel noise. As is typical, this interference has the statistics of white Gaussian noise. The $n^{th}$ symbol of the $k^{th}$ user is of interest and the user index k and the symbol index n are dropped. After despreading the received signal for the $k^{th}$ user and $n^{th}$ symbol and for all M paths and all L antennas, Equation 2 is derived as follows:

$$d_{m,l} = A h_{m,l} s + z_{m,l} \quad \text{Equation 2}$$

where $z_{m,l}$ is the residual signal at the despreader for $m^{th}$ path and $l^{th}$ receiver antenna.

It is traditionally and commonly assumed that all $z_{m,l}$ ($1 \leq m \leq M, 1 \leq l \leq L$) are Gaussian variables, and they are mutually uncorrelated across different multipath components and across different antennas. This assumption leads to a very simple and traditional receiver called a "Rake receiver" as shown in FIG. 1, where each Rake, or each branch in FIG. 1, estimates the complex channel weight gain (CWG) independently. As shown in FIG. 1, the antenna array has L elements, $110_1$ to $110_L$. For each element 110, a group of delays $112_{11}$ to $112_{LN}$, produce a group of delayed versions of the vector received by that element 110. Each delayed version is despread by a respective despreader $115_{11}$ to $115_{LN}$. Each despread output is input into a respective CWG generation circuit $105_{11}$ to $105_{LN}$. The derived CWGs are respectively applied to each despread output via respective multipliers $120_{11}$ to $120_{LN}$. The weighted outputs are combined by a combiner 125. The combiner 125 usually uses the maximum-ratio combining (MRC) in order to achieve the maximum signal-to-noise ratio at the combiner output. Mathematically, each Rake receiver estimates the channel gain $g_{m,l}$, where $g_{m,l}$ is an estimate of $Ah_{m,l}$, and noise variance $\sigma_{m,l}^2$, where $\sigma_{m,l}^2$, is an estimate of the power of $z_{m,l}$.) If MRC is used, the combiner generates $$\sum_{\substack{1 \leq m \leq M \\ 1 \leq l \leq L}} \frac{d_{m,l} g_{m,l}^*}{\sigma_{m,l}^2}.$$

Since $g_{m,l}$ is an estimate of $Ah_{m,l}$ and $\sigma_{m,l}^2$ is an estimate of the power of $z_{m,l}$, the generation of $g_{m,l}$ for any one particular Rake receiver is independent of all other Rake receivers. This approach assumes that all $z_{m,l}$ ($1 \leq m \leq M, 1 \leq l \leq L$) are zero mean Guassian variables, which are mutually uncorrelated across different multipath components and accross different antennas. However, there is correlation across the multipath components and antennas, which result in inter symbol interference (ISI). Also, due to correlation between multiple user also over the multipath components and antennas, multiple access interference (MAI) is also increased. Accordingly, the receiver performance is degraded.

Accordingly, it is desirable to have alternate receiver configurations.

SUMMARY

A receiver comprises a plurality of antenna elements for receiving a data signal. Each antenna element has a plurality of Rake fingers. Each Rake finger processes a received multipath component of the received data signal of its antenna element by applying a complex weight gain to that received multipath component. A complex weight gain generator determines the complex weight gain for each Rake finger for each antenna element using an input from all the Rake fingers. A summer combines an output of each Rake finger to produce an estimate of the data signal.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
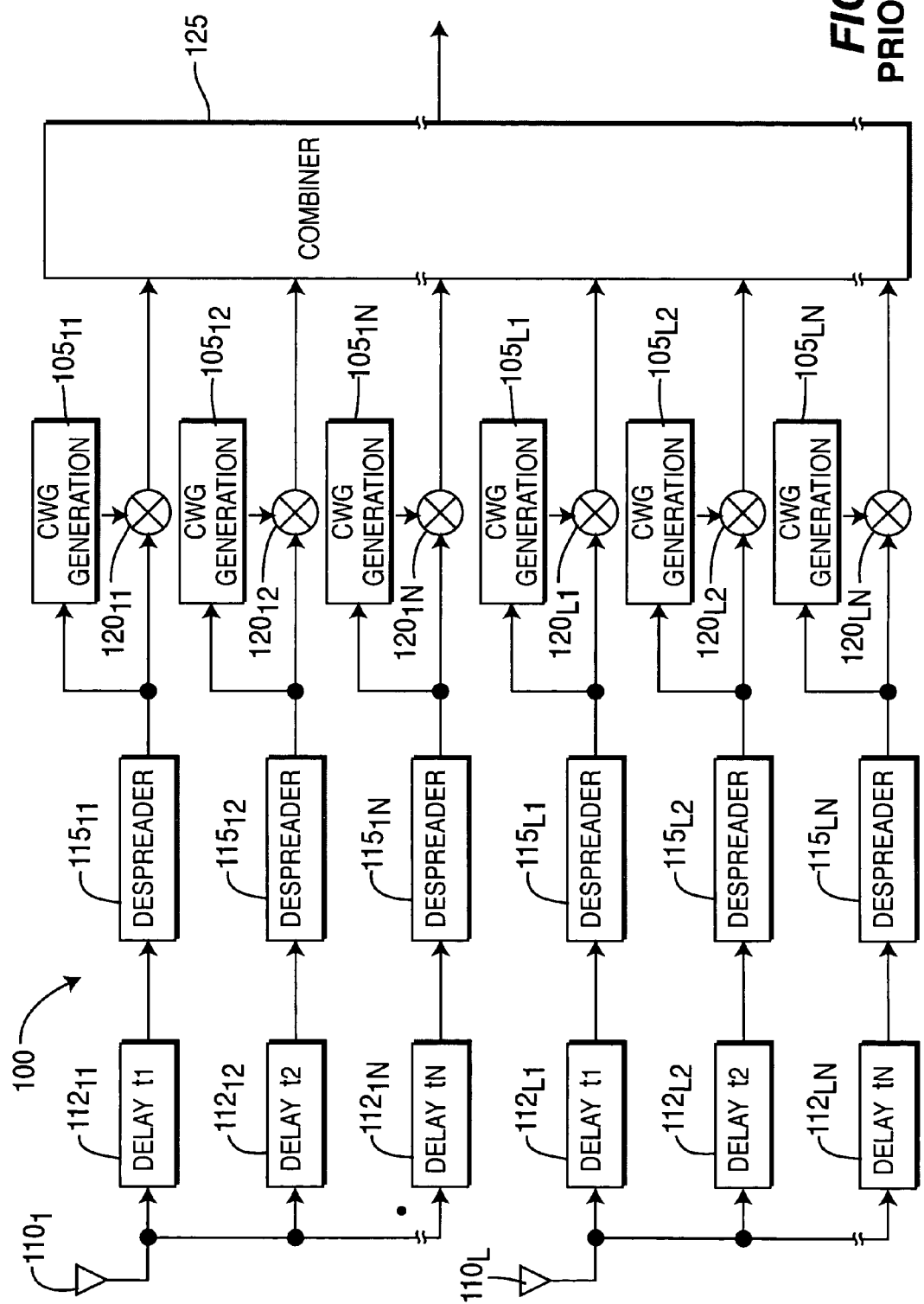
FIG. 1 is a prior art Rake receiver.

The preferred embodiments will be described with reference to the drawing figures where like numerals represent like elements throughout. Hereafter, a wireless transmit/receive unit (WTRU) includes, but is not limited, to a user equipment, a mobile station, a fixed or mobile subscriber unit, a pager, or any other type of device capable of operating in a wireless environment. When referred to hereafter, a base station includes, but is not limited to, a base station, a Node-B, a site controller, an access point, or any other interfacing device in a wireless environment. The multiple antenna element Rake receiver can be used in a WTRU, base station or both.

Using L receiver antenna elements, all Rake finger outputs are organized into groups having the same de-spread symbol into the same vector. Each Rake finger output is denoted as vector $d=[d_{1,1},d_{1,2}, \ldots ,d_{1,L},d_{2,1},d_{2,2}, \ldots ,d_{M,1},d_{M,2}, \ldots ,d_{M,L}]^T$. Similarly, the noise vector at each Rake finger output is denoted as $z=[z_{1,1},z_{1,2}, \ldots ,z_{1,L},z_{2,1},z_{2,2}, \ldots ,z_{M,1},z_{M,2}, \ldots ,z_{M,L}]^T$, and the channel vector for all Rake fingers are denoted as. $h=[h_{1,1},h_{1,2}, \ldots ,h_{1,L},h_{2,1},h_{2,2}, \ldots ,h_{M,1},h_{M,2}, \ldots ,h_{M,L}]^T$. Thus, Equation 3 is derived as follows:

$$d=AhS+z \qquad \text{Equation 3}$$

The noise correlation matrix is derived as per Equation 4:

$$R=E(zz^H)=E(dd^H)-A^2E|s|^2hh^H \qquad \text{Equation 4}$$

where for binary phase shift keying (BPSK) and quadrature phase shift keying (QPSK) modulation, $E|s|^2=1$, and Equation 4 is further simplified as per Equation 5:

$$R=E(zz^H)=E(dd^H)-A^2hh^H \qquad \text{Equation 5}$$

An optimal receiver in terms of maximizing the log-likelihood function provides the data detection as denoted as per Equation 6:

$$v=(R^{-1}h)^H d \qquad \text{Equation 6}$$

Figure 2:
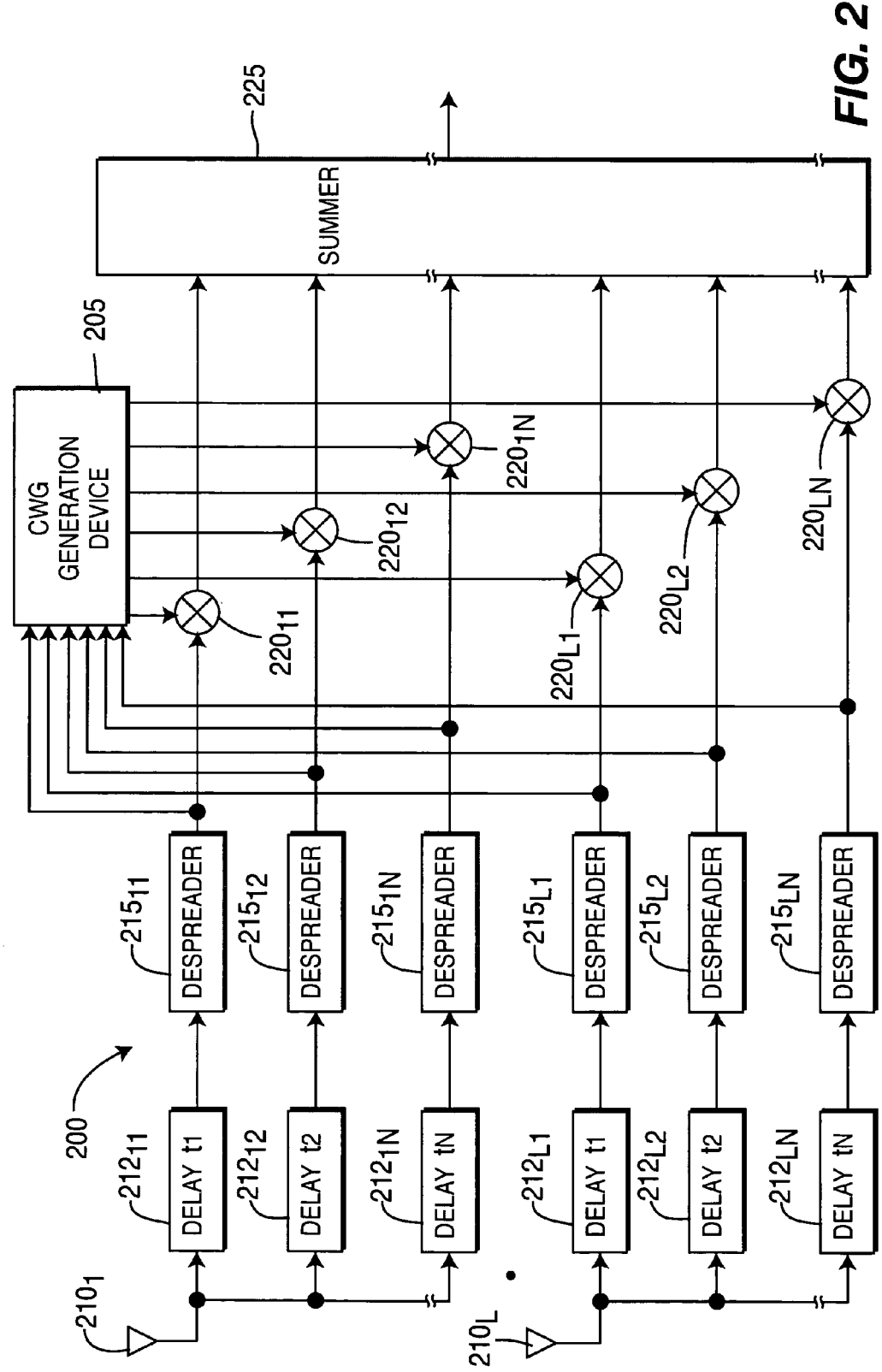
FIG. 2 is a block diagram of a Rake-based receiver with two receiver antennas operating in accordance with the present invention.
Figure 3:
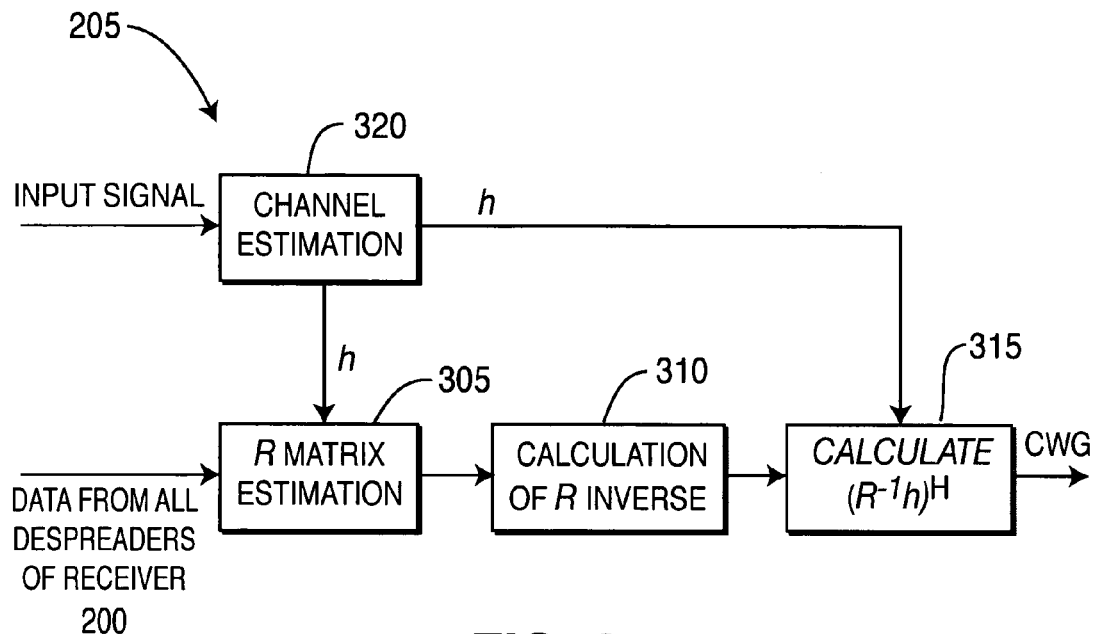
FIG. 3 is a block diagram of a CWG generation device used in conjunction with the receiver of FIG. 2.

FIG. 2 is a block diagram of a Rake-based receiver 200 using a CWG generation device 205 in conjunction with L receiver antenna elements $210_1$ to $210_L$. The components of FIG. 2 can be implemented on a single integrated circuit (IC), multiple ICs, discrete components or combination of integrated circuits and discrete components. For each element 210, a group of delays $212_{11}$ to $212_{LN}$, produce a group of delayed versions of the vector received by that element 210. Each delayed version is despread by a respective despreader $215_{11}$ to $215_{LN}$. All despreader outputs from the L antenna elements 210 for all multipaths are fed to a complex weight gain (CWG) generation device 205 (see FIG. 3), within which a channel estimation h is calculated 320, correlation matrix R is calculated 305 based on the data from all of the despreaders 215 and the channel estimation h, the inverse of R is calculated 310, and then the weight is calculated as $(R^{-1}h)^H$ 315. Each element of the calculated $(R^{-1}h)$ is applied as a CWG at each multiplier $220_{11}$ to $220_{LN}$ of each Rake finger. These weighted components are summed by a summer 225 to produce soft symbols. Accordingly, the CWG generated for any one Rake finger is derived from all of the despreaders 215.

Since the correlation matrix R considers each path for each antenna element, the complex weighting corrects for the ISI. Additionally, since this correction is also applied to other user signals, MAI is also suppressed to some extent across the antennas and paths.

The noise correlation matrix can be estimated, R, as per Equation 7:

$$\hat{R} = \frac{1}{N}\sum_{k=1}^{N} d(k)d(k)^H - \frac{1}{N}\sum_{k=1}^{N} \hat{h}(k)\hat{h}(k)^H \qquad \text{Equation 7}$$

where d(k) is the vector d for a $k^{th}$ symbol, $\hat{h}(k)$ is the channel estimation (which is also an estimate of vector Ah) for a $k^{th}$ symbol, N is the estimation length in symbols.

Figure 4:
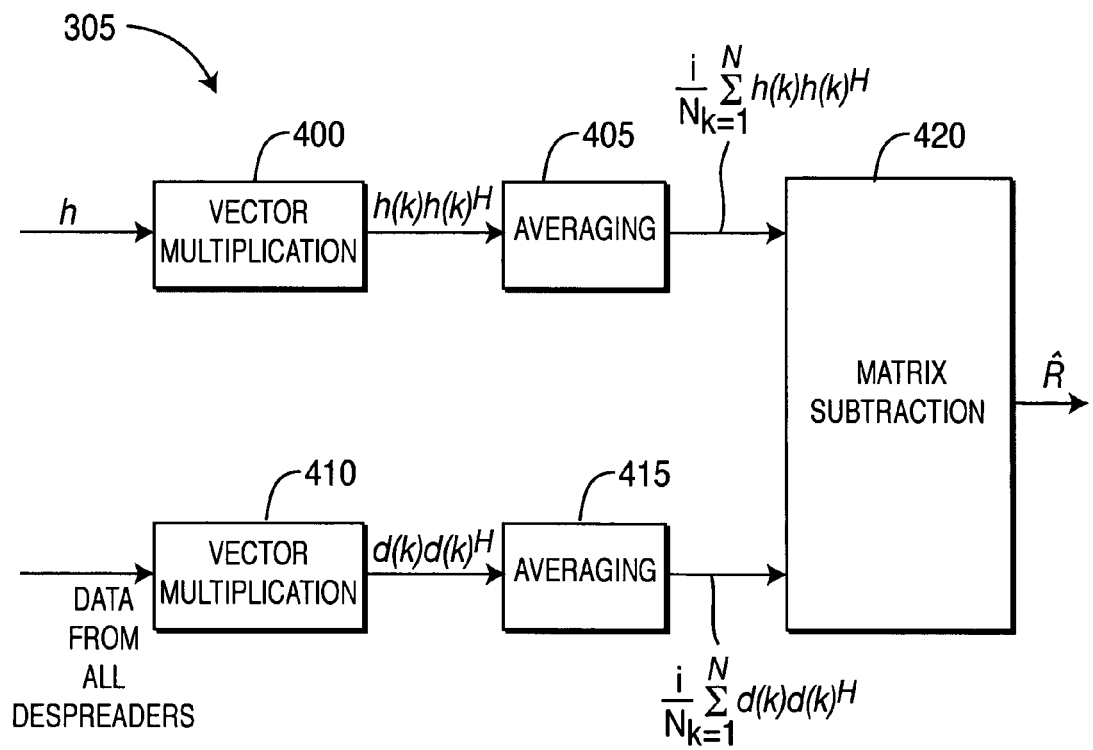
FIG. 4 is a block diagram of a circuit used to implement R estimation in conjunction with the receiver of FIG. 2.

In FIG. 4, an embodiment of the R matrix estimation 305 is shown. The channel estimation h is vector multiplied 400 by its complex conjugate transpose (Hermetian), producing $h(k)h(k)^H$. The multiplied results are averaged 405, $$\frac{1}{N}\sum_{k=1}^{N} h(k)h(k)^H.$$

The data from each despreader 215 is vector multiplied 410 by its Hermetian, producing $d(k)d(k)^H$. The results are averaged 415, $$\frac{1}{N}\sum_{k=1}^{N} d(k)d(k)^H.$$

Figure 5:
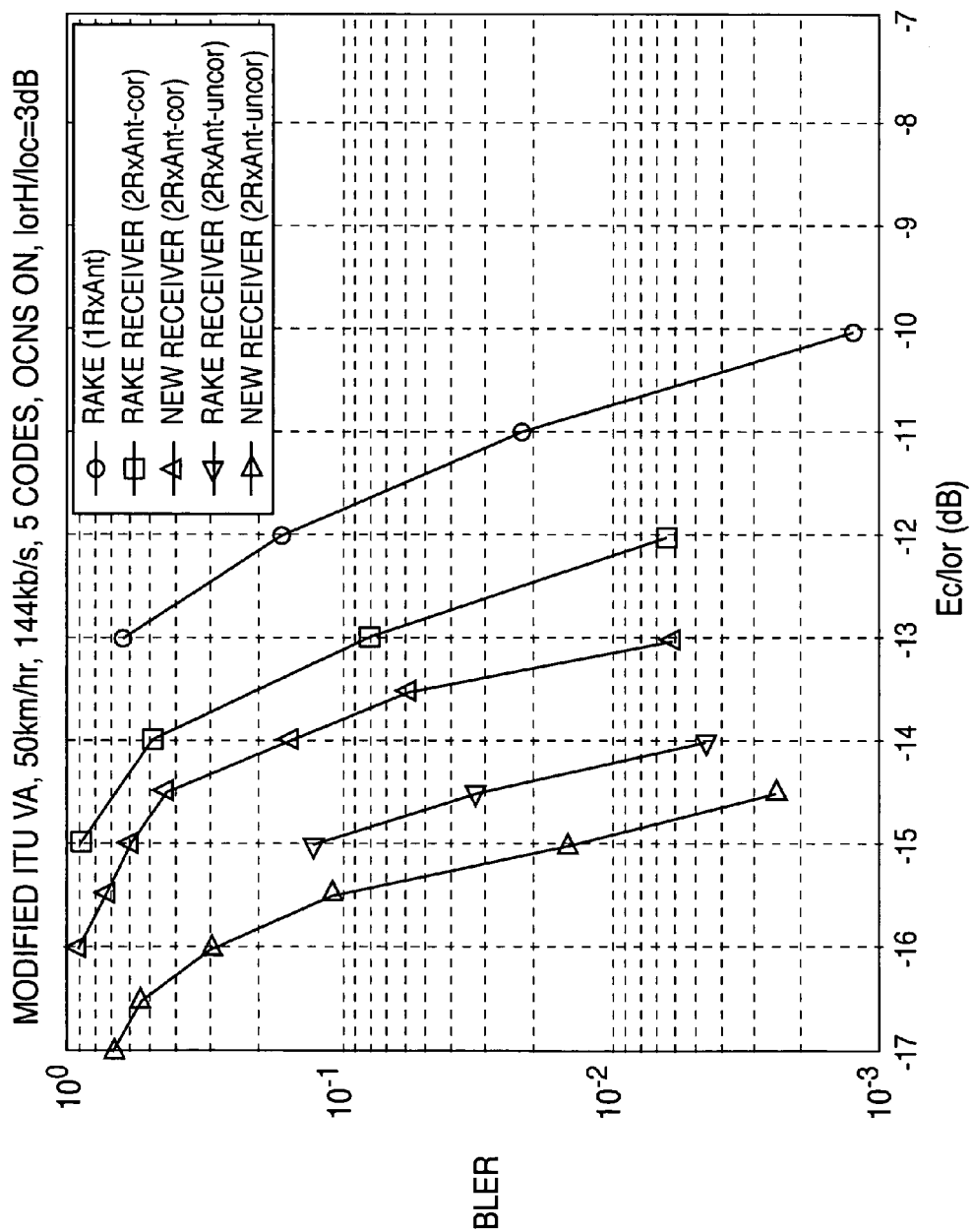
FIG. 5 compares the block error rate (BLER) at 50 km/hr between a conventional Rake receiver and the Rake receiver of FIG. 2.
Figure 6:
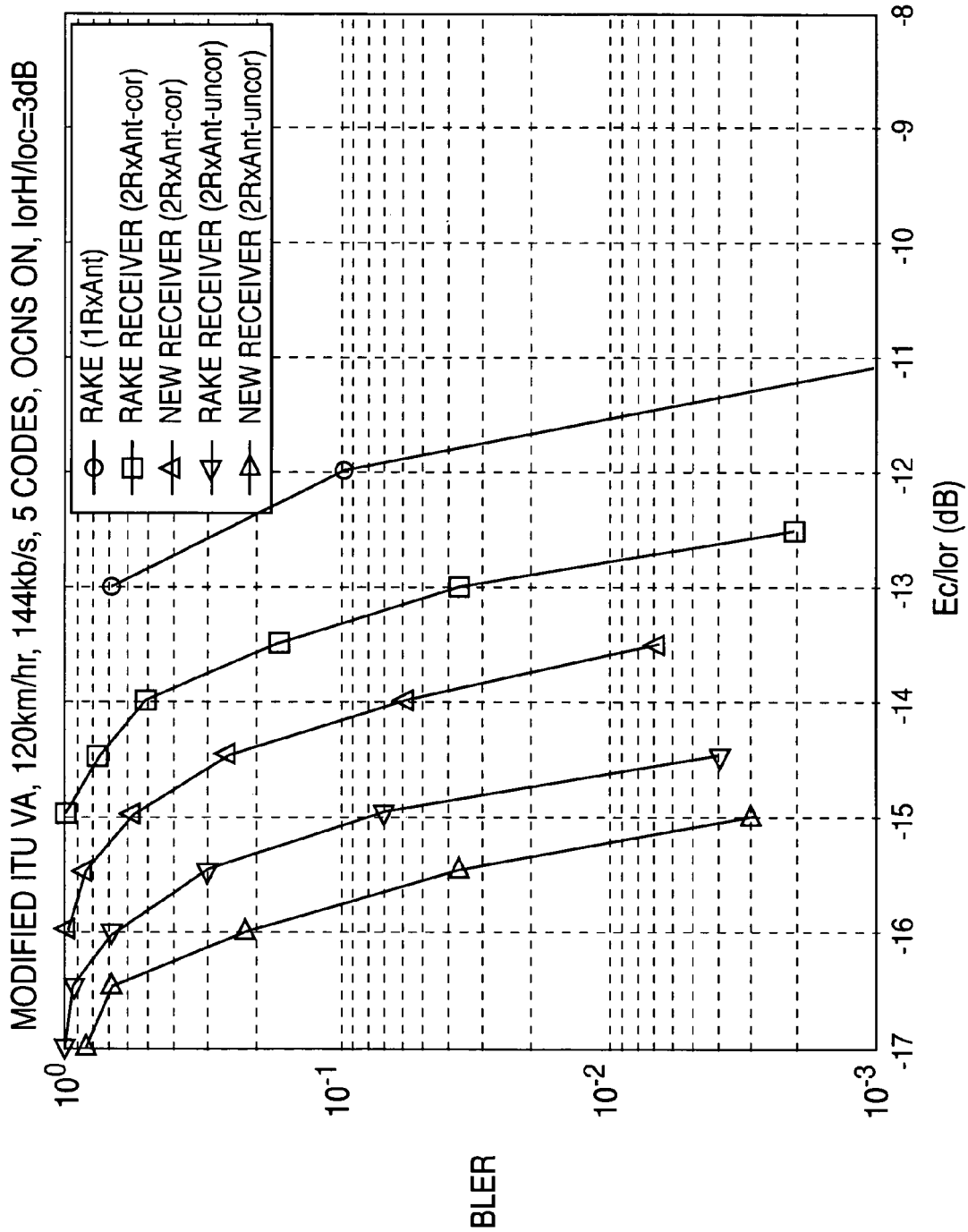
FIG. 6 compares the BLER at 120 km/hr between a conventional Rake receiver and the Rake receiver of FIG. 2.

A matrix subtraction 420 of the averaged channel estimate from the averaged data is performed, producing $\hat{R}$ as per Equation 7. FIG. 5 compares simulation results between a conventional Rake receiver and a Rake-based receiver using an International Telecommunications Union (ITU) voice activity factor (VA) channel model operating in accordance with the present invention at a vehicular speed of 50 km/hr. FIG. 6 compares simulation results between the conventional Rake receiver and the Rake-based receiver using an ITU VA channel model operating in accordance with the present invention at a vehicular speed of 120 km/hr. The simulations compare the performance of a traditional Rake with one antenna element "Rake(1RxAnt)", two correlated antenna elements "RakeReceiver(2RxAnt–cor)", two uncorrelated antenna elements and "RakeReceiver(2RxAnt–uncor)" to an uncorrelated embodiment of the present invention "NewReceiver(2RxAnt–uncor)" and a correlate embodiment "NewReceiver(2RxAnt–cor)". In each case, the receiver operating in accordance with the present invention provides much better performance than the conventional Rake receiver.

While the present invention has been described in terms of the preferred embodiment, other variations which are within the scope of the invention as outlined in the claims below will be apparent to those skilled in the art.

What is claimed is:

1. A receiver comprising:
   a plurality of antenna elements for receiving a data signal;
   for each antenna element, a plurality of Rake fingers coupled to the antenna element, each finger having a delay, a despreader and a complex weight gain weighing device;
   a complex weight gain generation device coupled to an output of each despreader and an input of each complex weight gain device, wherein the complex weight gain generation device performs a complex conjugate transpose of an inverse of a noise correlation matrix multiplied by a channel estimate, the noise correlation matrix being derived by averaging a multiplication of the channel estimate with its complex conjugate transpose over each Rake finger, producing a first matrix, and averaging a multiplication of the output of each despreader with its complex conjugate transpose over each Rake finger, producing a second matrix, and subtracting the first matrix from the second matrix, producing the noise correlation matrix; and
a summer coupled to an output of each complex weight gain device, producing an estimate of the data signal.

2. The receiver of claim 1 wherein for each Rake finger, the delay is coupled to its antenna element, the despreader is coupled to an output of the delay and the complex weight gain device is coupled to an output of the despreader.

3. A receiver comprising:
a plurality of antenna elements for receiving a data signal;
for each antenna element, a plurality of Rake fingers, each Rake finger including a despreader, each Rake finaer for processing a received multipath component of the received data signal of its antenna element by applying a complex weight gain to that received multipath component;
a complex weight gain generator for determining the complex weight gain for each Rake finger of each antenna element using an input from all of the Rake fingers, wherein the complex weight gain generator performs a complex conjugate transpose of an inverse of a noise correlation matrix multiplied by a channel estimate, the noise correlation matrix being derived by averaging a multiplication of the channel estimate with its complex conjugate transpose over each Rake finger, producing a first matrix, and averaging a multiplication of the output of each despreader with its complex conjugate transpose over each Rake finger, producing a second matrix, and subtracting the first matrix from the second matrix, producing the noise correlation matrix; and
a summer for combining an output of each Rake finger to produce an estimate of the data signal.

4. The receiver of claim 3 wherein the complex weight gain applied at each finger is an element of a resulting vector of the determined complex weight gains.

5. A receiver comprising:
a plurality of antenna element means for receiving a data signal;
for each antenna element means, a plurality of Rake finger means, each Rake finger means including a means for despreading, each Rake finger for processing a received multipath component of the received data signal of its antenna element means by applying a complex weight gain to that received multipath component;
a complex weight gain generating means for determining the complex weight gain for each Rake finger means of each antenna element means using an input from all of the Rake finger means, wherein the complex weight gain generating means determines the complex weight gains by performing a complex conjugate transpose of an inverse of a noise correlation matrix multiplied by a channel estimate, the noise correlation matrix is derived by averaging a multiplication of the channel estimate with its complex conjugate transpose over each Rake finger means, producing a first matrix, and averaging a multiplication of the output of each despreading means with its complex conjugate transpose over each Rake finger means, producing a second matrix, and subtracting the first matrix from the second matrix, producing the noise correlation matrix; and
means for combining an output of each Rake finger means to produce an estimate of the data signal.

6. The receiver of claim 5 wherein the complex weight gain applied at each Rake finger means is an element of a resulting vector of the determined complex weight gains.

7. A wireless transmit/receive unit (WTRU) comprising:
a plurality of antenna elements for receiving a data signal;
for each antenna element, a plurality of Rake fingers coupled to the antenna element, each finger having a delay, a despreader and a complex weight gain weighing device;
a complex weight gain generation device coupled to an output of each despreader and an input of each complex weight gain device, wherein the complex weight gain generation device performs a complex conjugate transpose of an inverse of a noise correlation matrix multiplied by a channel estimate, the noise correlation matrix being derived by averaging a multiplication of the channel estimate with its complex conjugate transpose over each Rake finger, producing a first matrix, and averaging a multiplication of the output of each despreader with its complex conjugate transpose over each Rake finger, producing a second matrix, and subtracting the first matrix from the second matrix, producing the noise correlation matrix; and
a summer coupled to an output of each complex weight gain device, producing an estimate of the data signal.

8. The WTRU of claim 7 wherein for each Rake finger, the delay is coupled to its antenna element, the despreader is coupled to an output of the delay and the complex weight gain device is coupled to an output of the despreader.

9. A wireless transmit/receive unit (WTRU) comprising:
a plurality of antenna elements for receiving a data signal;
for each antenna element, a plurality of Rake fingers, each Rake finger including a despreader, each Rake finger for processing a received multipath component of the received data signal of its antenna element by applying a complex weight gain to that received multipath component;
a complex weight gain generator for determining the complex weight gain for each Rake finger of each antenna element using an input from all of the Rake fingers, wherein the complex weight gain generator performs a complex conjugate transpose of an inverse of a noise correlation matrix multiplied by a channel estimate, the noise correlation matrix being derived by averaging a multiplication of the channel estimate with its complex conjugate transpose over each Rake finger, producing a first matrix, and averaging a multiplication of the output of each despreader with its complex conjugate transpose over each Rake finger, producing a second matrix, and subtracting the first matrix from the second matrix, producing the noise correlation matrix; and
a summer for combining an output of each Rake finger to produce an estimate of the data signal.

10. The WTRU of claim 9 wherein the complex weight gain applied at each finger is an element of a resulting vector of the determined complex weight gains.

11. A wireless transmit/receive unit (WTRU) comprising:
a plurality of antenna element means for receiving a data signal;
for each antenna element means, a plurality of Rake finger means, each Rake finger means including a means for despreading, each Rake finger for processing a received multipath component of the received data signal of its antenna element means by applying a complex weight gain to that received multipath component;
a complex weight gain generating means for determining the complex weight gain for each Rake finger means of each antenna element means using an input from all of the Rake finger means, wherein the complex weight gain generating means determines the complex weight gains by performing a complex conjugate transpose of an inverse of a noise correlation matrix multiplied by a channel estimate, the noise correlation matrix is derived by averaging a multiplication of the channel estimate with its complex conjugate transpose over each Rake finger means, producing a first matrix, and averaging a multiplication of the output of each despreading means with its complex conjugate transpose over each Rake finger means, producing a second matrix, and subtracting the first matrix from the second matrix, producing the noise correlation matrix; and means for combining an output of each Rake finger means to produce an estimate of the data signal.

12. The WTRU of claim 11 wherein the complex weight gain applied at each Rake finger means is an element of a resulting vector of the determined complex weight gains.

13. A base station comprising:
a plurality of antenna elements for receiving a data signal;
for each antenna element, a plurality of Rake fingers coupled to the antenna element, each finger having a delay, a despreader and a complex weight gain weighing device;
a complex weight gain generation device coupled to an output of each despreader and an input of each complex weight gain device, wherein the complex weight gain generation device performs a complex conjugate transpose of an inverse of a noise correlation matrix multiplied by a channel estimate, the noise correlation matrix being derived by averaging a multiplication of the channel estimate with its complex conjugate transpose over each Rake finger, producing a first matrix, and averaging a multiplication of the output of each despreader with its complex conjugate transpose over each Rake finger, producing a second matrix, and subtracting the first matrix from the second matrix, producing the noise correlation matrix; and
a summer coupled to an output of each complex weight gain device, producing an estimate of the data signal.

14. The base station of claim 13 wherein for each Rake finger, the delay is coupled to its antenna element, the despreader is coupled to an output of the delay and the complex weight gain device is coupled to an output of the despreader.

15. A base station comprising:
a plurality of antenna elements for receiving a data signal;
for each antenna element, a plurality of Rake fingers, each Rake finger including a despreader, each Rake finger for processing a received multipath component of the received data signal of its antenna element by applying a complex weight gain to that received multipath component;
a complex weight gain generator for determining the complex weight gain for each Rake finger of each antenna element using an input from all the Rake fingers, wherein the complex weight gain generator performs a complex conjugate transpose of an inverse of a noise correlation matrix multiplied by a channel estimate, the noise correlation matrix being derived by averaging a multiplication of the channel estimate with its complex conjugate transpose over each Rake finger, producing a first matrix, and averaging a multiplication of the output of each despreader with its complex conjugate transpose over each Rake finger, producing a second matrix, and subtracting the first matrix from the second matrix, producing the noise correlation matrix; and a summer for combining an output of each Rake finger to produce an estimate of the data signal.

16. The base station of claim 15 wherein the complex weight gain applied at each finger is an element of a resulting vector of the determined complex weight gains.

17. A base station comprising:
a plurality of antenna element means for receiving a data signal;
for each antenna element means, a plurality of Rake finger means, each Rake finger means including a means for despreading, each Rake finger means for processing a received multipath component of the received data signal of its antenna element means by applying a complex weight gain to that received multipath component;
a complex weight gain generating means for determining the complex weight gain for each Rake finger means of each antenna element means using an input from all the Rake finger means, wherein the complex weight gain generating means determines the complex weight gains by performing a complex conjugate transpose of an inverse of a noise correlation matrix multiplied by a channel estimate, the noise correlation matrix is derived by averaging a multiplication of the channel estimate with its complex conjugate transpose over each Rake finger means, producing a first matrix, and averaging a multiplication of the output of each despreading means with its complex conjugate transpose over each Rake finger means, producing a second matrix, and subtracting the first matrix from the second matrix, producing the noise correlation matrix; and
means for combining an output of each Rake finger means to produce an estimate of the data signal.

18. The base station of claim 17 wherein the complex weight gain applied at each Rake finger means is an element of a resulting vector of the determined complex weight gains.

19. An integrated circuit (IC) for processing a data signal comprising:
an input configured to receive an output from a plurality of antenna elements;
for each antenna element input, a plurality of Rake fingers coupled to the antenna element input, each finger having a delay, a despreader and a complex weight gain weighing device;
a complex weight gain generation device coupled to an output of each despreader and an input of each complex weight gain device, wherein the complex weight gain generation device performs a complex conjugate transpose of an inverse of a noise correlation matrix multiplied by a channel estimate, the noise correlation matrix being derived by averaging a multiplication of the channel estimate with its complex conjugate transpose over each Rake finger, producing a first matrix, and averaging a multiplication of the output of each despreader with its complex conjugate transpose over each Rake finger, producing a second matrix, and subtracting the first matrix from the second matrix, producing the noise correlation matrix; and
a summer coupled to an output of each complex weight gain device, producing an estimate of the data signal.

20. The IC of claim 19 wherein for each Rake finger, the delay is coupled to its antenna element, the despreader is coupled to an output of the delay and the complex weight gain device is coupled to an output of the despreader.

* * * * *

UNITED STATES PATENT AND TRADEMARK OFFICE
CERTIFICATE OF CORRECTION

PATENT NO. : 7,106,780 B2
APPLICATION NO. : 10/725788
DATED : September 12, 2006
INVENTOR(S) : Li et al.

It is certified that error appears in the above-identified patent and that said Letters Patent is hereby corrected as shown below:

IN THE DRAWINGS

At FIG. 4, after element #405, arrowed line should be tagged " $\frac{1}{N}\sum_{k=1}^{N} h(k)h(k)^{H}$ "

and after element #415, arrowed line should be tagged -- $\frac{1}{N}\sum_{k=1}^{N} d(k)d(k)^{H}$ --.

IN THE SPECIFICATION

At column 2, line 15, after the words "components and", delete "accross" and insert therefor --across--.

At column 3, line 14, before the word "Thus," delete "$h_{2,2},\ldots,h_{M,1,M,2},\ldots,h_{M,L}]^{T}$" and insert therefor -- $h_{2,2},\ldots,h_{M,1},h_{M,2},\ldots,h_{M,L}]^{T}$ --.

IN THE CLAIMS

At claim 3, column 5, line 13, after the words "each Rake", delete "finaer" and insert therefor --finger--.

At claim 4, column 5, line 36, after the word "each", insert --Rake--.

At claim 10, column 6, line 53, after the word "each", insert --Rake--.

UNITED STATES PATENT AND TRADEMARK OFFICE
CERTIFICATE OF CORRECTION

PATENT NO. : 7,106,780 B2
APPLICATION NO. : 10/725788
DATED : September 12, 2006
INVENTOR(S) : Li et al.

It is certified that error appears in the above-identified patent and that said Letters Patent is hereby corrected as shown below:

IN THE CLAIMS (cont'd)

At claim 16, column 8, line 4, after the word "each", insert --Rake--.

Signed and Sealed this

Second Day of October, 2007

JON W. DUDAS
*Director of the United States Patent and Trademark Office*